June 15, 1937.  W. H. WARD  2,083,882
FRICTION ELIMINATING UNIT FOR MOTION WEIGHING SUSPENSION SCALES
Filed Dec. 31, 1935  2 Sheets-Sheet 1

Fig.1.

INVENTOR
WILLARD H. WARD
BY
ATTORNEY

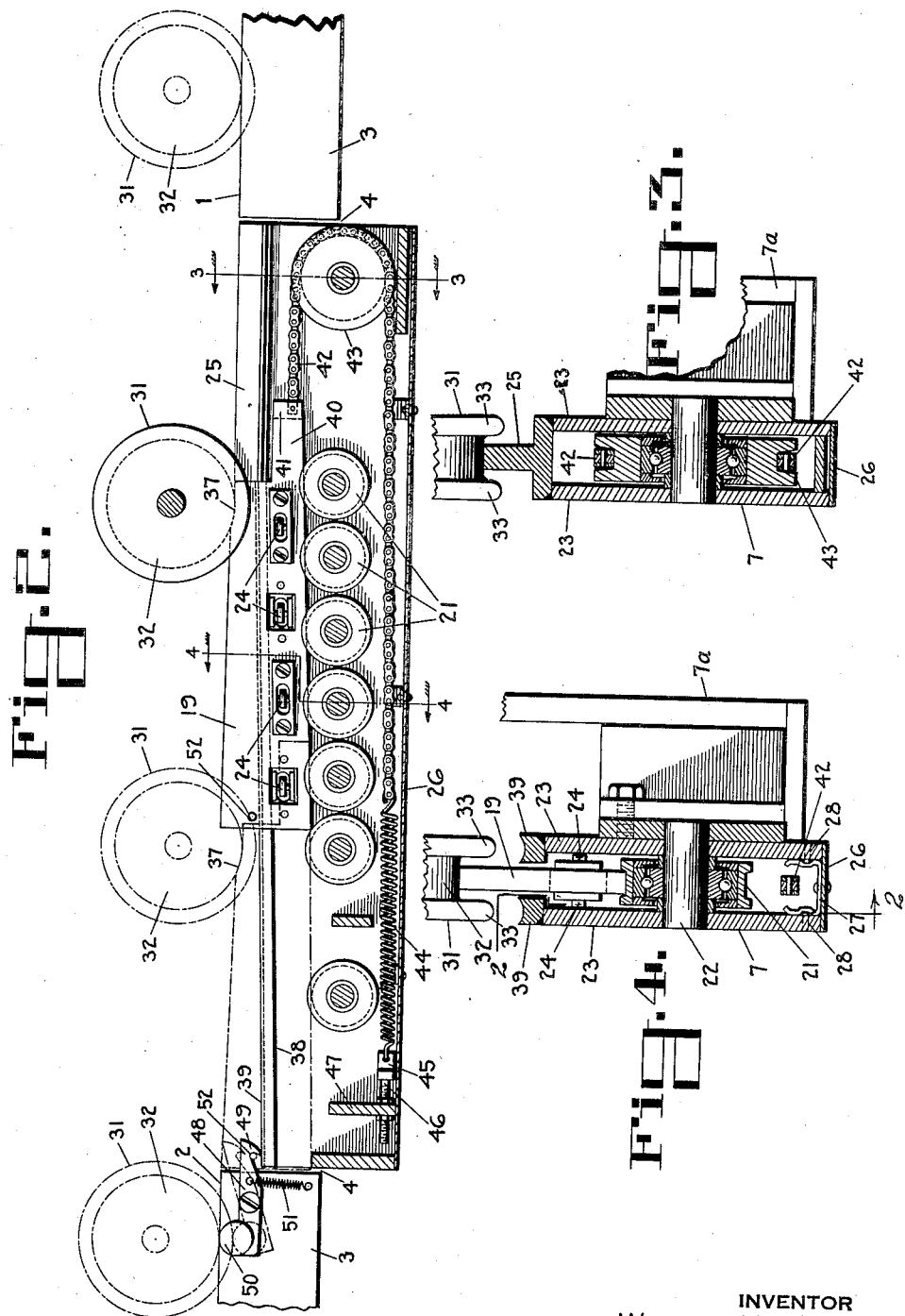

Patented June 15, 1937

2,083,882

UNITED STATES PATENT OFFICE 2,083,882

FRICTION ELIMINATING UNIT FOR MOTION WEIGHING SUSPENSION SCALES

Willard H. Ward, St. Johnsbury, Vt., assignor to E. and T. Fairbanks and Company, St. Johnsbury, Vt., a corporation of Vermont Application December 31, 1935, Serial No. 56,961

20 Claims. (Cl. 265—27)

This invention relates to improvements in friction eliminating units for motion weighing suspension scales.

It has been found difficult in prior devices of this kind involving motion weighing to relieve the carriers or rollers from engagement with lugs or other mechanisms carried by the drag chain which contact the carriers while the weighing operation is being performed. This is particularly evident in the conveyor chains of abattoir scales since the carriers attached to the moving chain usually become rusted and gummed up as do the chain lugs, and consequently the resulting friction and lag caused thereby prevent speedy and accurate weighing. In order to obviate this difficulty some devices have employed an inclined scale section of the main track at the weighing station with means at the lower end to stop the carrier for the weighing operation. By this method the frictional drag previously noted causes meat or other articles carried by the chain to swing on the carriers as each carrier proceeds and stops at the weighing station, so that it is not possible to obtain accurate weights.

Therefore, in order to effectively overcome this difficulty I have devised simple and dependable friction eliminating means which may be readily installed in the carrier system and will not interfere with its free and continuous operation.

An important object of this invention is to provide friction eliminating means employing a yieldable section of track suspended from the scale levers and provided with a slidable or floating carriage adapted to receive each carrier as it passes along from the main track, and to carry the carrier unimpeded to the opposite end of the main track, during which interval the weighing operation is performed.

Another object is to provide means at the outgoing end of the track for temporarily locking the yieldable track section at that point so as to enable the carrier to pass freely to the main track.

Another object is to provide means for automatically releasing the yieldable track section from the locking mechanism after the carrier has passed to the main track.

Still another object is to provide resilient means to return the slidable carriage of the yieldable track section after operation to its initial position.

In order that the nature of my invention may be fully understood, I have illustrated certain embodiments of the invention in the accompanying drawings, in which:

Figure 1 is a longitudinal front elevation of a section of the main overhead track of a scale at the weighing station embodying my invention and showing the suspended yieldable track section in its operative weighing position.

Figure 2 is a longitudinal section on the line 2—2 of Fig. 4, showing particularly the co-operating parts of the yieldable track section, and in dotted outline successive positions of the carrier wheel as it is carried along on the yieldable track section to the outgoing main track.

Figure 3 is a vertical cross section on the line 3—3 of Fig. 2, showing the approach end of the yieldable track section with the carrier wheel engaging the temporary retaining notch in the rail of the movable carriage of the yieldable track section.

Figure 4 is a vertical cross section on the line 4—4 of Fig. 2, showing the parts at the median point of the slidable carriage with the opposed spaced wheels for holding the carriage in a freely movable position therein.

In the drawings 1 and 2 designate adjoining incoming and outgoing sections respectively of the main track 3, which have an intervening open space 4 therebetween and are suspended by upwardly extending arms 5 from an overhead beam 6. Mounted in the intervening space 4 is an independent vertically movable resilient or yieldable track section 7 suspended by spaced hangers 7a attached to spaced cross bars 7b mounted on the top side of the side bars 8 of a frame 9, which is in turn suspended by spaced hooked rods 10 from links at the butt end of opposed levers 11, which are pivotally attached by links to spaced hooked rods 12 carried by spaced supports 13 mounted on the beam 6. The tips of the levers 11 are connected by links 14 to the inner end of an extension fulcrumed by a link to a plate 16, which is secured to an overhead beam 17, while the outer end of the extension lever 15 is pivotally connected by a link to the hooked end of the draft rod 18 operatively connected to the indicator of the weighing mechanism (not shown) for transmitting thereto the load imposed on the yieldable track section 7.

The yieldable track section 7, which constitutes the weighing station, comprises a slidable carriage or rail 19, which is disposed within an elongated casing 20, and rides on a series of grooved ball bearing rollers 21 transversely mounted in a descending plane on shafts 22 secured in the opposed side walls 23 of the casing. In order to guide the slidable rail 19 properly and provide for its free travel without friction between the side walls 23 of the casing, staggered laterally extending ball bearing side rollers 24 are mounted on each side of the rail and in their travel engage the casing side walls 23. A fixed approach rail 25 is mounted on the top of the casing 20 adjacent to the incoming main track section 1, while a detachable closure plate 26 is attached to the base of the casing by spring clips 27 carried by the closure plate, which engage opposed holding pieces 28 inserted in the side walls 23 of the casing.

Movably mounted on the main track 3 are a series of carriers 29, each of which is comprised of a depending hanger 30 carrying a grooved wheel 31 formed with a central hub portion 32 and spaced flanges 33, and having a hooked rod 34 or other suitable means for holding meat or other articles thereon swivelly attached to the lower end of the hanger 30. The grooved wheel 31 is adapted to travel on the central hub portion 32 along the main track 3 to and from the slidable rail 19 of the yieldable track section 7 constituting the weighing station. The carriers 29 are moved along successively by depending spaced lugs 35, which are carried by a movable drag chain 36 mounted overhead. Thus as each carrier wheel 31 rolls onto the slidable rail 19 its central hub portion 32 engages a curved recess 37 on the upper edge of the rail 19 at its inner end, when the rail with the carrier 29 thereon starts sliding under the influence of gravity on the rollers 21 down toward the lower end of the yieldable track section 7. Thus the movement of the carrier is so accelerated that it normally runs ahead of the drag chain lug 35, thereby relieving the carrier of any pressure against the lug and preventing any drag on the carrier, which would tend to cause inaccuracy in the weight.

However, if any of the carriers 29 should for any reason be retarded and be engaged by the chain lugs 35 during their travel on the slidable rail 19, there would be no appreciable lag to interfere with the accuracy of the weighing mechanism, due to the momentum of the load borne by each carrier. The momentum of the load tends to start the carrier 29 on to the slidable rail 19 after coming to rest in the curved recess 37 and to subsequently carry the slidable rail 19 downwardly under gravitational influence, while the drag chain 36 eventually overtakes the carrier and carries it on off the slidable rail 19 to the outgoing rail section 2.

Safety guide means for the carriers 29 during their downward travel is provided, including inclined upper edges 38 on the casing walls 23, which are inclined downwardly in the direction of the outgoing main track section 2 and having secured thereto grooved guide rails 39 adapted to catch and hold by the flanges 33 any carrier wheel 31 on the yieldable track section 7 that should happen to run off the slidable rail 19.

The means for retracting the slidable rail 19 after it has been unlocked includes an extension 40 leading from the inner end of the slidable rail 19 and extending below the approach rail 25, having attached to its end in a vertical slot 41 one end of a chain 42 adapted to pass over a grooved idler wheel 43, which chain has its other end secured to a retractile coiled spring 44 carried by a block 45 adjustably mounted by its threaded bolt 46 to the outer one of a pair of spacers 47 transversely disposed within the housing 20. By this means the slidable rail 19 moves in its forward operative movement with the load carried by the carrier 29 against the tension of the expanded coiled spring 44, which is adapted at the limit of travel of the slidable rail 19 to contract and thus retract the rail to its inoperative position (Fig. 2), as hereinafter described.

In order to lock and hold the slidable rail 19 at the end of its travel until the carrier 29 is given an opportunity to move a short distance on to the outgoing track section 2, a latch 48 is pivotally mounted thereon adjacent to the top of the track section and is provided with a hooked outer end 49, and a circular boss 50 secured to its inner end, while a coiled spring 51 attached to the outer end of the latch and to the track section 2 serves to cause the hooked end 49 to engage a transverse pin 52 in the side of the slidable rail 19 and thus hold the slidable rail 19 in a fixed position so as to permit the carrier wheel 31 to ride from the slidable rail 19 to the outgoing track section 2. When the wheel 31 passes to the outgoing track section 2 one of its flanges 33 engages the circular boss 50, which depresses the latch 48 and frees the hooked end 49 from the pin 52 and thereby releases the slidable rail 19 and permits it, with the yieldable track section 7, to return to its normal position. This operation places the slidable rail 19 in position to receive the succeeding carrier 29 approaching the weighing station.

The various successive operative positions of the carrier wheels 31 are graphically illustrated in Fig. 2.

It is to be noted that during the time the slidable rail 19 is moving from one end of the yieldable track section 7 to the other the weighing mechanism has had an opportunity to come to balance and indicate the weight of the load and the slidable rail 19 is then ready to be locked just before it reaches the lower part of its travel.

It will be particularly noted that the operation of the yieldable track section and its co-operating mechanism is entirely automatic and requires no synchronism with the lugs on the drag chain because, as has been hereinbefore described, the particular lug moving the carrier with its load off the yieldable track section automatically releases the slidable rail and permits it to return to its normal inoperative position to receive the succeeding carrier as it passes from the approach rail.

While I have shown a preferred embodiment of my invention it is evident that modifications of the invention may be made that will come within the scope thereof and, therefore, I do not desire to limit the invention to the exact form of construction shown and described herein.

I claim,

1. In a device of the character described, weighing mechanism, a suspended main track provided with an incoming section and an outgoing section and an intervening open space therebetween, and a yieldable section of track suspended from the weighing mechanism, disposed in the said open space and provided with a slidable or floating carriage.

2. In a device of the character described, weighing mechanism, a suspended main track provided with an incoming section and an outgoing section and an intervening open space therebetween, carrier means for the load adapted to travel over the main track, and a yieldable section of track suspended from the weighing mechanism, disposed in the said open space and having a slidable or floating carriage mounted therein adapted to receive and support the said carrier means and its load during the weighing operation.

3. In a device of the character described, weighing mechanism, a suspended main track provided with an incoming section and an outgoing section and an intervening open space therebetween, carrier means for the load adapted to travel over the main track, a yieldable section of track suspended from the weighing mechanism and disposed in the said open space, adapted to receive and support the said carrier means and its load during the weighing operation, and a slidable or floating carriage mounted in the yieldable track section, adapted to move in a descending plane and to receive and carry the said carrier means and its load over the yieldable track section.

4. In a device of the character described, weighing mechanism, a suspended main track provided with an incoming section and an outgoing section and an intervening open space therebetween, carrier means for the load adapted to travel over the main track, a yieldable section of track suspended from the weighing mechanism and disposed in the said open space, adapted to receive and support the said carrier means and its load during the weighing operation, a carriage slidably mounted in the yieldable track section and adapted to receive and carry the said carrier means and its load over the yieldable track section, and means on the said carriage adapted to temporarily arrest and hold the said carrier means thereon during its travel over the yieldable track section.

5. In a device of the character described, weighing mechanism, a suspended main track provided with an incoming section and an outgoing section and an intervening open space therebetween, carrier means for the load adapted to travel over the main track, a yieldable section of track suspended from the weighing mechanism and disposed in the said open space, a carriage yieldable mounted in the slidable track section adapted to transport the carrier means and its load over the yieldable track section, and means for temporarily locking the slidable carriage so as to permit the said carrier means to travel uninterruptedly to the main track.

6. In a device of the character described, weighing mechanism, a suspended main track provided with an incoming section and an outgoing section and an intervening open space therebetween, carrier means for the load adapted to travel over the main track, a yieldable section of track suspended from the weighing mechanism and disposed in the said open space, a carriage slidably mounted in the yieldable track section adapted to transport the carrier means and its load over the yieldable track section, means for temporarily locking the slidable carriage so as to permit the said carrier means to travel uninterruptedly to the main track, and means for automatically releasing the slidable carriage from the locking means after the said carrier has passed to the main track.

7. In a device of the character described, weighing mechanism, a suspended main track provided with an incoming section and an outgoing section and an intervening open space therebetween, carrier means for the load adapted to travel over the main track, a yieldable section of track suspended from the weighing mechanism and disposed in the said open space, a carriage slidably mounted in the yieldable track section and adapted to receive and carry the said carrier means and its load over the yieldable track section, means for temporarily locking the slidable carriage so as to permit the said carrier means to travel uninterruptedly to the main track, means for automatically releasing the slidable carriage from the locking means after the said carrier has passed to the main track, and resilient means for automatically returning the yieldable track section to its initial position upon its release from the locking means.

8. In a device of the character described, weighing mechanism, a suspended main track provided with an incoming section and an outgoing section and an intervening open space therebetween, a series of carriers each carrying its load and traveling over the main track, a yieldable section of track suspended from the weighing mechanism, disposed in the said open space and provided with a slidable carriage adapted to receive and support each of the said carriers and its load during its travel over the said yieldable track section while the weighing operation is taking place, and a traveling chain longitudinally disposed above the main track and yieldable track section and provided with spaced, depending means adapted to engage and push successively each of the series of carriers along the main track as well as to and from the yieldable track section.

9. In a device of the character described, weighing mechanism including suspended levers, a suspended main track having an incoming section and an outgoing section with an intervening open space therebetween, a frame suspended from the said levers by spaced hangers, a series of carriers each being adapted to carry its load and traveling over the main track, a yieldable track section suspended by spaced hangers from the frame and located in the said open space, and a slidable carriage mounted in the said yieldable track section and provided with a slidable rail adapted to support and successively carry the said carriers over the said track section during the weighing operation.

10. In a device of the character described, weighing mechanism including suspended levers, a suspended main track having an incoming section and an outgoing section with an intervening open space therebetween, a series of carriers each of which is provided with a grooved wheel and a depending hanger for carrying a load, a frame suspended by spaced hangers from the said levers, a yieldable track section suspended by spaced hangers from the frame and located in the said open space, and a slidable carriage operable within the yieldable track section and carrying a slidable rail mounted on a series of rollers and adapted to support and successively carry the said carriers over the said track section during the weighing operation.

11. In a device of the character described, weighing mechanism including suspended levers, a suspended main track having an incoming section and an outgoing section with an intervening open space therebetween, a series of carriers traveling over the main track, each of which is provided with a grooved wheel and a depending hanger for carrying a load, a frame suspended by spaced hangers from the said levers, a yieldable track section suspended by spaced hangers from the frame and located in the said open space, adapted to receive successively each carrier and to support the carrier and its load during the weighing operation, and a carriage slidably mounted on spaced, grooved ball bearing rollers in the said yieldable track section and adapted to receive each carrier wheel and carry each carrier with its load over the yieldable track section at the weighing station.

12. In a device of the character described, weighing mechanism including suspended levers, a suspended main track having an incoming section and an outgoing section with an intervening open space therebetween, a series of carriers traveling over the main track, each of which is provided with a grooved wheel and a depending hanger for carrying a load, a yieldable track section having an open rectangular casing and suspended by spaced hangers from the frame and located in the said open space, adapted to receive successively each carrier and to support the carrier and its load during the weighing operation, and a slidable rail disposed within the said yieldable track section casing and mounted therein on spaced, grooved ball bearing rollers and adapted to receive the grooved carrier wheel and carry each carrier with its load over the yieldable track section at the weighing station.

13. In a device of the character described, weighing mechanism including suspended levers, a suspended main track having an incoming section and an outgoing section with an intervening open space therebetween, a series of carriers traveling over the main track, each of which is provided with a grooved wheel and a depending hanger for carrying a load, a frame suspended by spaced hangers from the said levers, a yieldable track section suspended by spaced hangers from the frame and located in the said open space, adapted to receive the grooved wheel of each carrier and to support the carrier and its load during the weighing operation, and a carriage slidably mounted on spaced, grooved ball bearing rollers disposed in a descending plane in the said yieldable track section and adapted to be engaged by the grooved carrier wheel and carry each carrier with its load over the yieldable track section at the weighing station.

14. In a device of the character described, weighing mechanism including suspended levers, a suspended main track having an incoming section and an outgoing section with an intervening open space therebetween, a series of carriers traveling over the main track, each of which is provided with a grooved wheel and a depending hanger for carrying a load, a yieldable track section having an open rectangular casing suspended from the levers and located in the said open space, adapted to receive successively each carrier and to support the carrier and its load during the weighing operation, a slidable rail disposed within the said yieldable track section casing and mounted therein on spaced, grooved ball bearing rollers and adapted to receive the grooved carrier wheel and carry each carrier with its load over the yieldable track section at the weighing station, and means for guiding the said rail freely within the casing comprising staggered ball bearing rollers mounted on each side thereof and engaging the casing side walls in their travel.

15. In a device of the character described, weighing mechanism including suspended levers, a suspended main track having an incoming section and an outgoing section with an intervening open space therebetween a series of carriers traveling over the main track, each of which is provided with a grooved wheel and a depending hanger for carrying a load, a yieldable track section having an open rectangular casing suspended from the levers and located in the said open space, adapted to receive successively each carrier and to support the carrier and its load during the weighing operation, a slidable rail disposed within the said yieldable track section casing and mounted therein on spaced, grooved ball bearing rollers and adapted to receive the grooved carrier wheel and carry each carrier with its load over the yieldable track section at the weighing station, and a recessed portion in the tread at the inner end of the said slidable rail adapted to temporarily arrest and hold each carrier as it is carried over the yieldable track section at the weighing station.

16. In a device of the character described, weighing mechanism including suspended levers, a suspended main track having an incoming section and an outgoing section with an intervening open space therebetween, a series of carriers traveling over the main track, each of which is provided with a grooved wheel and a depending hanger for carrying a load, a yieldable track section having an open rectangular casing suspended from the levers and located in the said open space, adapted to receive successively each carrier and to support the carrier and its load during the weighing operation, a slidable rail disposed within the said yieldable track section casing and mounted therein on spaced, grooved ball bearing rollers and adapted to receive the grooved carrier wheel and carry each carrier with its load over the yieldable track section at the weighing station, and means for temporarily locking the said slidable rail of the yieldable track section to the outgoing track section, upon completion of the weighing operation in order to permit each carrier to move to the outgoing track section, the said locking means comprising a spring actuated latch pivotally mounted on the side of the outgoing track section adjacent to the tread thereof, provided at its outer end with a hooked end adapted to engage a transversely extending pin in the side of the slidable rail in locking the parts together.

17. In a device of the character described, weighing mechanism including suspended levers, a suspended main track having an incoming section and an outgoing section with an intervening open space therebetween, a series of carriers traveling over the main track, each of which is provided with a grooved wheel and a depending hanger for carrying a load, a yieldable track section having an open rectangular casing suspended from the levers and located in the said open space, adapted to receive successively each carrier and to support the carrier and its load during the weighing operation, a slidable rail disposed within the said yieldable track section casing and mounted therein on spaced, grooved ball bearing rollers and adapted to receive the grooved carrier wheel and carry each carrier with its load over the yieldable track section at the weighing station, and a fixed approach rail mounted on the top of the casing of the yieldable track section and adjacent to the incoming main track section.

18. In a device of the character described, weighing mechanism including suspended levers, a suspended main track having an incoming section and an outgoing section with an intervening open space therebetween, a series of carriers traveling over the main track, each of which is provided with a grooved wheel and a depending hanger for carrying a load, a yieldable track section having an open rectangular casing suspended from the levers and located in the said open space, adapted to receive successively each carrier and to support the carrier and its load during the weighing operation, a slidable rail disposed within the said yieldable track section casing and mounted therein on spaced, grooved ball bearing rollers and adapted to receive the grooved carrier wheel and carry each carrier with its load over the yieldable track section at the weighing station, means for temporarily locking the said slidable rail of the yieldable track section to the outgoing track section, upon completion of the weighing operation in order to permit each carrier to move to the outgoing track section, the said locking means comprising a spring actuated latch pivotally mounted on the side of the outgoing track section adjacent to the tread thereof, provided at its outer end with a hooked end adapted to engage a transversely extending pin in the side of the slidable rail in locking the parts together, and means for automatically unlocking the said latch comprising an upwardly extending circular boss secured to its inner end and adapted to be engaged by the flange of the carrier wheel just after it has passed from the yieldable track section to the end of the outgoing track section, thereby depressing the outer arm of the latch and releasing the hooked end from the transverse pin in the slidable rail and freeing the yieldable track section and slidable rail to return to their normal positions.

19. In a device of the character described, weighing mechanism including suspended levers, a suspended main track having an incoming section and an outgoing section with an intervening open space therebetween, a series of carriers traveling over the main track, each of which is provided with a grooved wheel and a depending hanger for carrying a load, a yieldable track section having an open rectangular casing suspended from the levers and located in the said open space, adapted to receive successively each carrier and its load during the weighing operation, a slidable rail disposed within the said yieldable track section casing and mounted therein on spaced, grooved ball bearing rollers and adapted to receive the grooved carrier wheel and carry each carrier with its load over the yieldable track section at the weighing station, means for temporarily locking and subsequently releasing the slidable rail of the yieldable track section in order to allow the carrier wheel to ride from the slidable rail to the outgoing track section, and means for automatically retracting the slidable rail, upon being freed from the locking means, to its initial position comprising a chain attached at one end to the inner end thereof, passing over a grooved idler wheel and having its other end attached to one end of a spiral spring adjustably mounted in the base of the said yieldable track section.

20. In a device of the character described, weighing mechanism including suspended levers, a suspended main track having an incoming section and an outgoing section with an intervening open space therebetween, a series of carriers traveling over the main track, each of which is provided with a grooved wheel and a depending hanger for carrying a load, a yieldable track section having an open rectangular casing suspended from the levers and located in the said open space, adapted to receive successively each carrier and to support the carrier and its load during the weighing operation, a slidable rail disposed within the said yieldable track section casing and mounted therein on spaced, grooved ball bearing rollers and adapted to receive the grooved carrier wheel and carry each carrier with its load over the yieldable track section at the weighing station, and safety guide means for the carriers as they travel downwardly on the said slidable rail including inclined upper edges on the spaced side walls of the yieldable track section casing and having secured thereto grooved guide rails adapted to catch and hold thereon any carrier wheel that may run off the slidable rail in its travel.

WILLARD H. WARD.